(12) United States Patent
Cox et al.

(10) Patent No.: US 9,001,923 B2
(45) Date of Patent: Apr. 7, 2015

(54) PERFORMANCE PREDICTION IN COMMUNICATION SYSTEMS

(71) Applicants: Donald C. Cox, Stanford, CA (US); Thomas G. McGiffen, Menlo Park, CA (US)

(72) Inventors: Donald C. Cox, Stanford, CA (US); Thomas G. McGiffen, Menlo Park, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 71 days.

(21) Appl. No.: 13/666,820

(22) Filed: Nov. 1, 2012

(65) Prior Publication Data

US 2013/0107928 A1    May 2, 2013

Related U.S. Application Data

(60) Provisional application No. 61/554,211, filed on Nov. 1, 2011.

(51) Int. Cl.
  *H04L 27/00*  (2006.01)
  *H04B 17/00*  (2006.01)
  *H04L 1/00*  (2006.01)
  *H04L 1/06*  (2006.01)
  *H04L 1/20*  (2006.01)

(52) U.S. Cl.
  CPC .......... *H04B 17/0075* (2013.01); *H04L 1/0003* (2013.01); *H04L 1/0006* (2013.01); *H04L 1/0019* (2013.01); *H04L 1/06* (2013.01); *H04L 1/203* (2013.01); *H04L 1/0009* (2013.01)

(58) Field of Classification Search
  CPC ............................ H04L 1/0003; H04L 1/0071
  USPC .............. 375/295, 224, 267; 455/63.1, 67.11
  See application file for complete search history.

(56) References Cited

U.S. PATENT DOCUMENTS 8,103,469 B1 * 1/2012 Wong et al. ................. 702/66
2004/0219883 A1 * 11/2004 Pauli et al. ............. 455/67.11

OTHER PUBLICATIONS

K. Cho et al., "On the General BER Expression of One- and Two-Dimensional Amplitude Modulations", IEEE Trans. Comm., vol. 50, No. 7, pp. 1074-1080, Jul. 2002.
M. Simon, et al., "A Unified Approach to the Performace Analysis of Digital Communication over Generalized Fading Channels", Proceedings of the IEE, vol. 86, No. 9, pp. 1860-1877, Sep. 1988.
A. Viterbi, "Convoluational Codes and Their Performance in Communication Systems", IEEE Trans Comm., v. 19, No. 5, Oct. 1971.

(Continued)

*Primary Examiner* — Khai Tran
(74) *Attorney, Agent, or Firm* — Mintz Levin Cohn Ferris Glovsky and Popeo, P.C.

(57) ABSTRACT

Methods and apparatus, including computer program products, are provided performance prediction. In one aspect there is provided a method. The method may include receiving information including one or more of a set of weights, a set of events, and a channel estimate, wherein at least one of the set of weights and the set of events are determined based on a optimization; and determining a transmitter configuration by performing at least one of: applying the set of weights to a set of pair wise error probabilities to determine a set of predicted bit error rates, and applying the set of events to the set of pair wise error probabilities to determine a set of predicted packet error rates. Related apparatus, systems, methods, and articles are also described.

17 Claims, 5 Drawing Sheets

(56) References Cited

OTHER PUBLICATIONS

T. McGiffen, et al., "Performance Prediction for Turbo Codes in MIMO Wireless Systems", Sarnoff Symposium, Apr. 28-30, 2008.

J.C. Koshy et al., "A Low Complexity Iterative Receiver for High Spectral-Efficiency Battlefield MIMO Communications", Milcom 2005, vol. 2, pp. 1033-1039.

B. Hassibi, et al., "How Much Training Is Needed in Multiple-Antenna Wireless Links?", IEEE Trans on Info Theory, vol. 49, No. 4, Apr. 2003.

J. Balakrishnan, et al., "Optimal Channel Trainig for Multiple Antenna Systems", Proc Conf Multiple Access, Mobility and Teletraffic for Wireless Comm (MMT), Dec. 2000.

A. Paulraj, et al., "Introduction to Space-Time Wireless Communications", Cambridge University Press, 2003.

T. McGiffen, et al., "Performance Prediction in Adaptive Mimo Systems", WCNC, Apr. 5-8, 2009.

S. Boyd et al., "Convex Optimization", Cambridge University Press, 2004, downloaded from the internet at: <http:www.stanford.edu/~boyd/cvxbook>.

ETSI TR 125 996 v6.1.0 (Sep. 2003), "Spacial (sic) channel model for Multiple Input Multiple Output (MIMO) simulations", European Telecomm Standartds Inst, Sep. 2003.

Webpage for WINNER Wireless World Initiative New Radio, <http://www.ist-winner.org/>.

* cited by examiner

Receive, for optimization, data (e.g., channel estimate H, received noise, observed BER, observed PER, from actual or simulated receiver/transmitter operation). — 310

Determine PEP approximations based on the channel and noise measurements — 320

Apply optimization using the determined PEP and the observed BERs, PERs such that a product of an optimized minimal weights vector and the PEP approximations best matches the BERs and apply optimization such that the product of an optimized minimal events vector and the PEP approximations best matches the PERs. — 330

PERFORMANCE PREDICTION IN COMMUNICATION SYSTEMS

REFERENCE TO PRIORITY DOCUMENT

This application claims priority to U.S. Provisional Patent Application Ser. No. 61/554,211, entitled "High Accuracy, Low Complexity Performance Prediction in Wireless Systems, filed on Nov. 1, 2011, which is hereby incorporated by reference in its entirety.

FIELD OF THE INVENTION

The present invention relates generally to communication systems. More specifically, it relates to improved techniques for performance prediction in communication systems.

BACKGROUND

Before transmitting data in a communication system, the system may determine what the configuration of the transmitter should be to provide sufficient link performance as measured by a performance metric, such as a signal-to-noise ratio, a signal-to-interference-plus-noise ratio, an average bit error rate (BER), a packet error rate after decoding error correction decoding, and any other indication of the performance of a channel. For example, the configuration of the transmitter may be specified by one or more of the following: a modulation type, such as quadrature amplitude modulation and the like; a level of modulation, such as 4-level quadrature amplitude modulation (QAM), 8-level QAM, and the like; a code rate; a transmit power; and a number of streams to be used for multiple input, multiple output (MIMO), such as 2 transmit and receive streams, 4 streams, and the like. If the transmitter configuration is not selected properly, the transmission link may be underutilized or the link may be unusable due to excess errors.

SUMMARY

Methods and apparatus, including computer program products, are provided for performance prediction. In one aspect, there is provided a method. The method may include receiving information including one or more of a set of weights, a set of events, and a channel estimate, wherein at least one of the set of weights and the set of events are determined based on a optimization; and determining a transmitter configuration by performing at least one of: applying the set of weights to a set of pair wise error probabilities to determine a set of predicted bit error rates, and applying the set of events to the set of pair wise error probabilities to determine a set of predicted packet error rates.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings, In the drawings.

Like labels are used to refer to same or similar items in the drawings.

DETAILED DESCRIPTION

In communication systems, such as multiple input, multiple output (MIMO) wireless systems, predicting performance prior to data transmission may be used to select a certain transmitter configuration. For example, a transmitter may predict the performance of one or more configurations to be used for transmission and then select one of these configurations for transmission. A transmitter configuration may comprise one or more of the following transmitter settings (also referred to as transmitter parameters): a modulation type, a level of modulation, a transmit power, a code rate, and a number of streams, and the like.

In some example embodiments, performance prediction may be preceded by an optimization phase. In the optimization phase, the communication system may determine data representative of system operation namely, the BER, PER, and pairwise error probabilities (PEPs), the last of which may be derived from channel information. The PEPs may be implemented as a so-called "PEP approximation" (also referred to herein as a simplified PEP a as described further below) to reduce the computational burden associated with predicting the performance of a given transmitter configuration. Then, an optimization may be performed on the determined data to generate a set of coefficients, which may include weight vectors and event vectors.

In a separate prediction phase, a receiver of the communication system may first estimate (e.g., determine, measure, and the like) the channel, to determine one or more channel coefficients (H) and/or background noise. Using the channel estimate and the weight and/or event vectors (which were determined in the optimization phase), the BER and/or PER may be predicted for a given transmitter configuration. This BER and/or PER prediction may be repeated over one or more transmitter configurations to enable a selection of an optimal transmitter configuration. This predicted BER and/or PER may be determined based on simplified PEPs. Once the optimal configuration is selected, the optimal transmitter configuration may be used by the transmitter to send data to one or more receivers.

Before providing additional examples, the following provides an example of a system framework in which some of the example embodiments described herein may be implemented.

Figure 1:
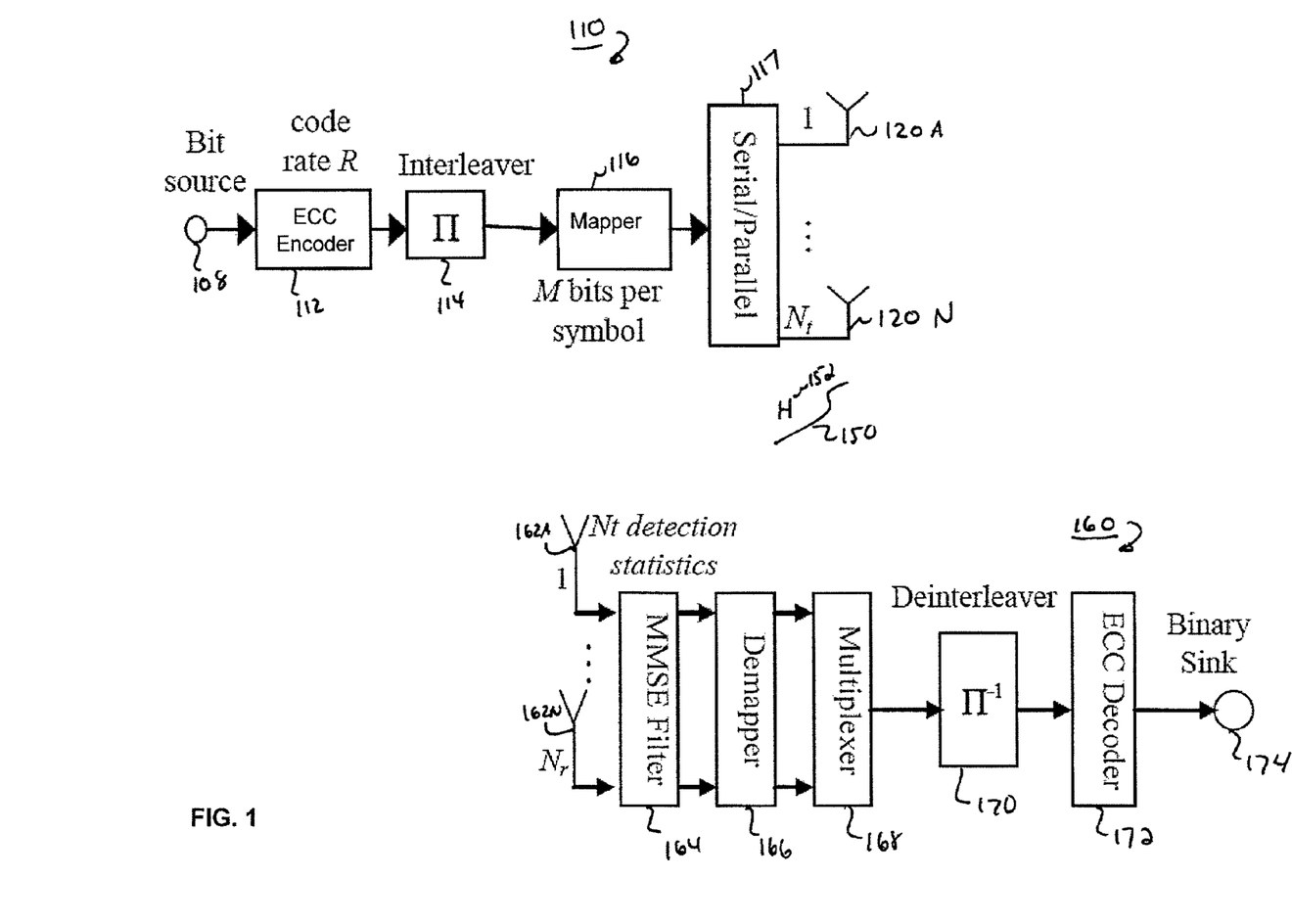
FIG. 1 depicts an example system, in accordance with some example embodiments.

FIG. 1 shows an example of a wireless communication system 100 including a transmitter 110 and a receiver 160. The transmitter 110 may include an error correction code (ECC) encoder 112 configured to provide error correction coding to received bits 108, which may be configured into one or more blocks. The encoder 112 may provide an output to interleaver 114 configured to interleave over the coded block. The output of the interleaver 114 may then be provided to mapper 116 to map each of the encoded, interleaved blocks to symbol constellations, such as quadrature amplitude modulation (QAM), and the like. The constellations may be provided to the serial-to-parallel converter 117 to allow mapping to one or more frequencies and/or one or more antennas 120A-N for transmission to receiver 160 as a signal 150 carrying the information represented by bits 108.

Although FIG. 1 depicts a specific configuration of the transmitter 110 and receiver 160, other configurations may be used as well. Although some of the examples described herein refer to predicting performance using BER and PER for MIMO wireless systems, other types of performance metrics may be used as part of the prediction disclosed herein and those metrics may be used with systems other than MIMO wireless systems as well. Furthermore, although some of the examples refer to wireless communication systems, the subject matter described herein may be used with wired systems as well.

In wireless communication system 100 having a quantity, $N_t$, of transmit antennas, and a quantity, $N_r$, of receive antennas, the received signal may be represented mathematically as follows:

$$y = Hs + n \quad \text{Equation (1)}$$

wherein
  y represents the $N_r \times 1$ received signal vector,
  s represents the $N_t \times 1$ transmitted symbol vector,
  H represents the $N_r \times N_t$ channel matrix known at the receiver, and
  n represents the $N_r \times 1$ noise vector.

The transmitted signal 150 traverses at least one radio channel (labeled H 152), is then received at one or more of antennas 162A-N, and then processed by a minimum mean-squared error filter 164, demapper 166, multiplexer 168, deinterleaver 170, and error correction code decoder 172 to provide bits 174.

Figure 2:
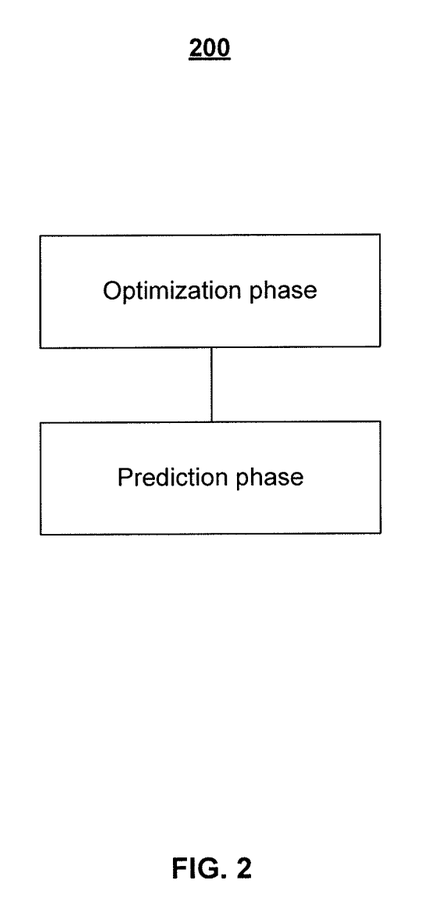
FIG. 2 depicts an example of a process for optimization and performance prediction, in accordance with some example embodiments.

FIG. 2 depicts an example of a process 200, in accordance with some example embodiments. Referring to FIG. 2, the process may include an optimization phase 210 and a prediction phase 220. The description of process 200 also refers to FIG. 1.

At 210, the optimization phase may provide one or more values, such as weight vectors and event vectors, which may be used in the prediction phase. For example, a data processor may obtain, for one or more channels, data including a channel sample (H), BER, PER, and the like. This data may represent actual measurements made by a receiver or simulated measurements. Moreover, this data may be measured off-line before the prediction phase 220, although the data may be measured at other times as well. For example, by either simulation or in-situ measurements, transmitter 110 may transmit a signal 150 carrying data over a channel H 152, so that it is received and decoded at receiver 160. Next, the receiver 152 may determine the BER, PER, and samples measurements of the channel H based on this received signal. Moreover, the transmissions may be repeated for one or more trials (e.g., at different times) and may be repeated for a plurality of channel frequencies (in which case there may be a plurality of channel estimates H). The BER, PER, and samples of the channel H may then be recorded to allow a data processor to compute a pair-wise error probability (PEP) for each of the trails, as described further below. Next, the data processor may perform an optimization, such as a convex optimization, as described further below, to determine weight vectors and/or event vectors. These weight and event vectors may be provided to the prediction phase 220 to allow subsequent predictions of the performance of system 100. Each unique error correction code may necessitate a unique weight vector and unique event vector associated with this error correction code.

At 220, a prediction phase may be used to predict the performance of a wireless communication system having a certain transmitter configuration. For example, before data transmission at wireless communication system 100, the predicted performance may be determined to allow a selection of a transmitter configuration (which may also comprise adjusting a current transmitter configuration as well). Specifically, receiver 160 may measure channel, H, and use the channel measurement H to determine a set of PEPs. The PEPs may be applied to the event and weight vectors (which were determined during the optimization phase 210) to map a given transmitter configuration into predicted performance parameters, such as BER and/or PER, for the channel. The receiver may then return an optimal (e.g., suitable) transmitter configuration to the transmitter to allow the transmitter to transmit using the optimal transmitter configuration. Moreover, this performance prediction may be repeated over time to optimize the transmitter as conditions change.

Although the previous example describes the receiver measuring the channel H and the receiver performing other portions of the prediction, these operations may be performed at any other locations and/or devices as well.

Figure 3:
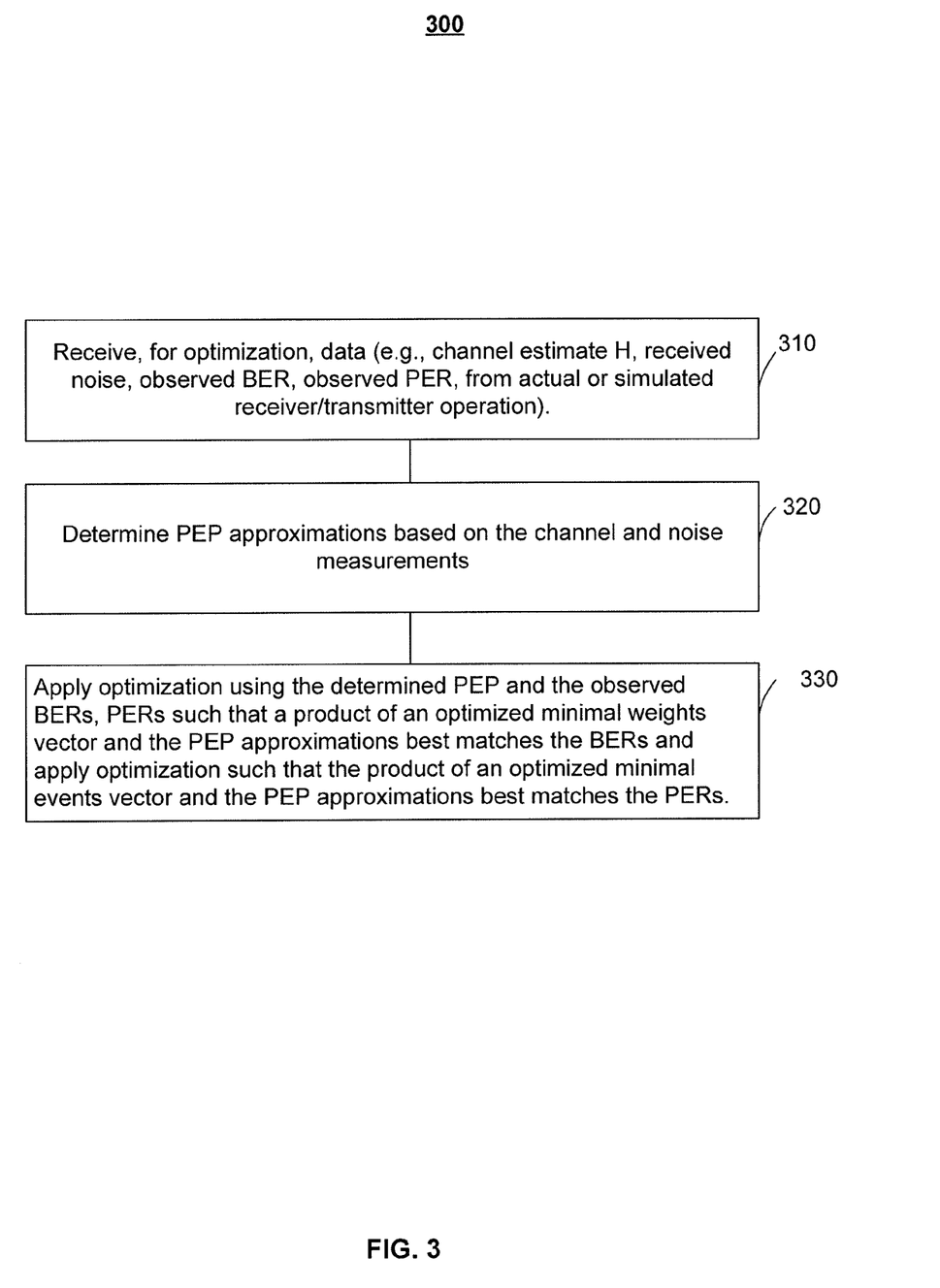
FIG. 3 depicts an example of a process for optimization, in accordance with some example embodiments.

FIG. 3 depicts an example of a process 300 for implementing the optimization phase 210, in accordance with some example embodiments. One or more aspects of process 300 may be implemented by a data processor.

At 310, data may be received for the optimization. The data may include channel sample values, such as H, SNR, SINR, BER, PER, and/or any other values representative of the channel(s). As noted, the received data may represent simulated data or in situ data.

At 320, PEP approximations may be determined based on the channels (Hs), and noise measurements. For example, the union bound upper bounds the BER based on the following equation:

$$BER \leq \sum_{d=d_{free}}^{\infty} \text{weight}(d) PEP(d) \quad \text{Equation (2)}$$

wherein
  PEP(d) represents the pairwise error probability between the transmitted codeword and a codeword differing by d coded bits,
  $d_{free}$ is the minimum d, and
  weight(d) is the total number of message bit errors over all erroneous codewords differing from the transmitted codeword by d bits.

The union bound also upper bounds the PER based on the following equation:

$$PER \leq \sum_{d=d_{free}}^{\infty} \text{event}(d) PEP(d) \quad \text{Equation (3)}$$

wherein
  event(d) is the number of codewords with d bits different than the transmitted codeword.

For example, in the case of 4-level QAM on random channels, the PEP may be determined based on the following equation:

$$PEP(d) = \frac{1}{\pi}\int_0^{\pi/2}\left[\int_\eta \exp(-\eta/2\sin^2\theta)p_\eta(\eta)d\eta\right]^d d\theta \quad \text{Equation (4A)}$$

wherein $\eta = E_{e,r}/2\sigma_{n+1}^2$, $E_{e,r}$ represents the average received symbol energy, $p_\eta$ represents the probability density function (PDF) of $\eta$, $\sigma_{n+1}$ is the variance of the noise plus interference (e.g., Gaussian noise). In any case, the integral-based PEP calculation may be simplified into discrete form as noted below. In the case of 16-QAM, Equation (4A) may take the following form:

$$PEP_{Pmf}(d) = \frac{1}{\pi}\int_0^{\pi/2}\int_\eta\left[\left(\sum_\alpha p_{an}(\alpha)\exp(-\alpha\eta/2\sin^2\theta)\right) + \frac{1}{2}\left(\sum_\alpha p_{a0f}(\alpha)\exp(-\alpha\eta/2\sin^2\theta)\right)\right]^d p_\eta(\eta)d\eta d\theta. \quad \text{Equation (4B)}$$

wherein $\alpha$ corresponds to a scale factor. The scale factor may, in some example embodiments, correspond to the $\alpha$ described at T. McGiffen, D. Cox, J. Koshy, "Performance Prediction in Adaptive MIMO Systems," WCNC, 5-8 April 2009, Budapest, Hungary, which is incorporated herein by reference in its entirety. And, in the case of 64-QAM, Equation (4A) may take the following form:

$$PEP_{Pmf}(d) = \frac{1}{2\pi}\int_0^{\pi/2}\left[\int_\eta\begin{pmatrix}\sum_\alpha p_{a0n}(\alpha)\exp(-\alpha\eta/2\sin^2\theta) + \\ \sum_\alpha p_{azf}(\alpha)\exp(\alpha\eta/2\sin^2\theta) + \\ \sum_\alpha p_{a1n}(\alpha)\exp(-\alpha\eta/2\sin^2\theta) + \\ \sum_\alpha p_{a1f}(\alpha)\exp(-\alpha\eta/2\sin^2\theta)\end{pmatrix}p_\eta(\eta)d\eta\right]^d d\theta. \quad \text{Equation (4C)}$$

Referring again to Equation (4A), the integral-based PEP calculation may be simplified into discrete form as noted below. In some example embodiments, channel training may be used to estimate the channel estimate H. For the $k^{th}$ stream received at the MMSE 164 of receiver 160, the SINR, $\theta_k$, may be represented as follows:

$$\eta_k = \frac{1}{\left[\left(\frac{E_s}{2\sigma_n^2}H^H H + I\right)^{-1}\right]_{k,k}} - 1 \quad \text{Equation (5)}$$

wherein $E_s$ represents the average transmit symbol energy per transmit antenna ($E(s^H s) = N_t E_s$), the superscript H represents the Hermetian transpose operator, I represents the identity matrix, and $\sigma_n^2$ represents the noise variance per receive antenna ($E(n^H n) = N_r \sigma_n^2$. In Equation (5), the subscript reflects that the SINR may be stream dependent. Channel estimate H may vary over time and/or frequency, and may be sampled over time and/or frequency. Using Equation (5), the samples of channel H may be converted into samples of SINR, $\eta_k$. Due to interleaving, each antenna stream may be equally likely. As such, an equal number of collected samples from each antenna stream may be pooled into a single set, in which case the stream-dependent subscript to $\eta_k$ may be dropped, which may be denoted as the set $\{\eta_s\}$, $s = 1, \ldots, S$. This set represents $p_\eta(\eta)$; $p(\eta_s) = 1/S$. Given this representation of $p_\eta(\eta)$ and numerical integration, Equation (5) is numerically represented as:

$$PEP(d) = \frac{\Delta\theta}{\pi}\sum_{n=0}^{N}C_n\left[\frac{1}{S}\sum_{s=1}^{S}\exp(-\eta_s/2\sin^2 n\Delta\theta)\right]^d \quad \text{Equation (6)}$$

wherein $\Delta\theta$ is the change in $\theta$, a dummy variable of integration in Equation (5), $N\Delta\theta$ may equal about $\pi/2$, $C_n$ may equal $\frac{1}{2}$ for n may equal 0, N; 1 otherwise, assuming a trapezoid rule for integration.

In some example embodiments, the union bound, although accurate for low BERs and PERs, may require hundreds and even thousands of double integrals to determine values associated with Equations (2), (3), and (6). These calculations may not be practical in a radio, such as a base station, a cell phone, and the like, due to processing limitations, computational burden, and time constraints. In some example embodiments, this complexity may be addressed by reducing the computational burden of the PEP and/or computing a minimal number of PEPs.

To reduce the computational burden of PEP(d), a relatively large value of $\Delta\theta$ may be used at Equation (6) to reduce the number of inner summations, thus minimizing the numerical complexity of calculating the PEP. Specifically, at the core of Equation (4A) is a kernel. With $\eta$ held constant, this is a smooth and an increasing function of $\theta$ over the interval [0, $\pi/2$], which corresponds to the outer integral limits. In the inner integral, Equation (4A) averages over $p_\eta(\eta)$, a family of these smooth, increasing functions of $\theta$. So, the inner integral yields a smooth and an increasing function of $\theta$. This integral is taken to the $d^{th}$ power, yielding a final smooth and increasing function of $\theta$. Because this outer integral is of a smooth and an increasing function, when computed numerically in Equation (6), fewer intervals may be needed to maintain a desired accuracy, when compared to a function that increases and decreases and/or is discontinuous over the integration interval. At $\theta$ equal to zero, the inner integral is zero, so one sum operation is eliminated. Accordingly, Equation (6) may be computed with relatively few inner summations by using a relatively large $\Delta\theta$, such as $\Delta\theta = \pi/4$, although other values of $\Delta\theta$ may be used as well, with $0 < \Delta\theta \leq \pi/2$, although other values may be used as well. The phrase "simplified PEP" or approximated PEP is used herein to refer to the PEP computed with a relatively large $\Delta\theta$.

To reduce the number of simplified PEPs used, the union bound may be viewed as a weighted family of functions, PEP(d), that model the BER and/or PER. The BER, PER, and PEP(d) are smooth, decreasing functions of the SNR. This may be used to model the BER and/or PER with very few PEPs. In some example embodiments, the BER and/or PER are modeled with a reduced, simplified set of PEPs.

At 310, a unique set of optimization data for a particular error correction code, and perhaps other parameters such as QAM level, is gathered. At 330, an optimization is applied to a unique set of optimization data gathered at 310, and the PEPs determined at 320 associated with this set, such that a product of an optimized minimal weights (or event) vector and the PEP approximations best matches the BERs (or PERs). For example, during the optimization phase of the weights vector, optimization data (e.g., measured BERs from simulation, or live system operation and the associated channel data (H) which was used in the simulation or system operation that produced each BER) may be gathered. Using the channel data H, simplified PEPs may be calculated as noted above based on at least Equation (6). The predicted BER is a product of these simplified PEPs and weights vector. Weights vector are then formed with relatively few non-zero coefficients that best-fit this product to the set of measured BERs in the optimization data, using optimization procedures, as further described below.

For the optimization phase of the BER, a small subset of coded bits d may be selected, such that weight(d) is allowed to be non-zero, and the remaining values for weight(d) may be set to zero. Convex optimization may then be performed on the BER, so Equation (2) below is approximately true, but only the small subset of non-zero coefficients are used. Next, a new subset of coded bits d may be selected, and then the convex optimization is repeated, exhaustively searching over the allowed range of coded bits d. The weight(d) may be used from the best match to the optimization data in subsequent performance prediction.

Accordingly, Equation (2) may be represented as follows:

$$BER \approx \sum_{\{d_1,\ldots,d_n\}} PEP(d) \text{weight}(d) \qquad \text{Equation (7)}$$

wherein $\{d_1, \ldots, d_n\}$ represent a current small subset of distances such that weight(d) is allowed to be non-zero. Here, the PEP(d) is the simplified PEP.

In matrix form, over the optimization data, Equation (7) may be represented as follows:

$$\begin{bmatrix} BER(1) \\ BER(2) \\ \vdots \end{bmatrix} \approx \begin{bmatrix} PEP(1, d_1) & \ldots & PEP(1, d_n) \\ PEP(2, d_1) & \ldots & PEP(2, d_n) \\ \vdots & & \vdots \end{bmatrix} \begin{bmatrix} \text{weight}(d_1) \\ \vdots \\ \text{weight}(d_n) \end{bmatrix} \qquad \text{Equation (8)}$$

wherein the indices 1, 2, . . . correspond to a given trial that generated optimization data to be used in determining the weights vector. And, Equation (8) may be further represented as follows:

$$BER \approx PEP \cdot \text{weight} \qquad \text{Equation (9)}$$

Given that the difference (e.g., in dB) between the predicted and the actual BER and/or PER is what needs to be optimized, the BER may also be modeled in accordance with the following equation:

$$\min_{\text{weight}} |\log(PEP \cdot \text{weight}) - \log(BER)|_\infty \qquad \text{Equation (10)}$$

wherein
$\log([a\ b\ c\ \ldots\ ]^T) = [\log(a)\ \log(b)\ \log(c)\ \ldots\ ]^T$, and
$|\cdot|_\infty$ represents the maximum absolute value of any element of that vector. Although Equation (10) is not convex functions, the last line of Equation (11) is convex as depicted below:

$$\min_{\text{weight}} |\log(PEP \cdot \text{weight}) - \log(BER)|_\infty = \qquad \text{Equation (11)}$$

$$\min_{\text{weight}} |\log(\overline{PEP}_B \cdot \text{weight})|_\infty =$$

$$\min_{\text{weight}} |\overline{PEP}_B \cdot \text{weight} - 1|_\infty,$$

wherein $$\overline{PEP}_B = \begin{bmatrix} \dfrac{PEP(1, d_1)}{BER(1)} & \ldots & \dfrac{PEP(1, d_n)}{BER(1)} \\ \dfrac{PEP(2, d_1)}{BER(2)} & \ldots & \dfrac{PEP(2, d_n)}{BER(2)} \\ \vdots & & \vdots \end{bmatrix}, \qquad \text{Equation (12)}$$

wherein $1 = [1\ 1\ 1\ \ldots\ ]^T$. And, as noted above, the simplified PEP is used in Equations (11) and (12).

The optimization may thus follow from Equation (11). Specifically, a selection is made of the quantity of non-zero coefficients to be used as the weights vector, and this quantity of non-zero coefficients may be referred to as n. In some example embodiments, the value n may be 2, although other values of n may be used as well. Next, a set of non-zero coefficients, out of all possible n-sets, is determined which best satisfies Equation (11) on the optimization data. In some example embodiments, an exhaustive search may be performed to select the best fit. When this is the case, n-set of coefficients may be selected and a convex optimization of Equation (11) may be performed using this n-set. Next, another n-set is selected, and the convex optimization of Equation (11) is repeated. This process may continue until all possible n-sets have been exhausted. The n-set that best satisfies Equation (11) may be considered the optimum set.

Although the previous example performs the convex optimization based on the BER Equation (2), a similar process may be performed using the PER Equation (3).

In some example embodiments, the optimization may be based on the PEP-weight product being greater than the BERs in the optimization data to produce a more conservative predictor. Moreover, the predicted value should also decrease with increasing SNR. To that end, the weight may be constrained to be greater than or equal to zero (weight≥0), in some example embodiments. When this is the case, the convex optimization may optimize Equation (13) for the weight vectors associated with the BER and Equation (14) for the event vectors associated with the PEP as follows:

$$\min_{\text{weight}} |\overline{PEP}_B \cdot \text{weight} - 1|_\infty \qquad \text{Equation (13)}$$

Subject to: $-\overline{PEP}_B \cdot \text{weight} \leq 1 - \text{weight} \leq 0$,
and -continued $$\min_{\text{event}} |\overline{PEP_P} \cdot \text{event} - 1|_{\infty} \quad \text{Equation (14)}$$

Subject to: $-\overline{PEP_P} \cdot \text{event} \leq 1 - \text{event} \leq 0$.

As such, the weight vectors and/or event vectors may be determined based on the convex optimization and, for example, Equations (13) and (14) above and based on a simplified PEP. The weight and event vectors are provided to the prediction phase 220.

The range where the BER prediction is accurate may be controlled by selecting a similar range of BERs used in the optimization. Similarly, the range where the PER prediction is accurate may be controlled by selecting a similar range of PERs used in the optimization.

Figure 4:
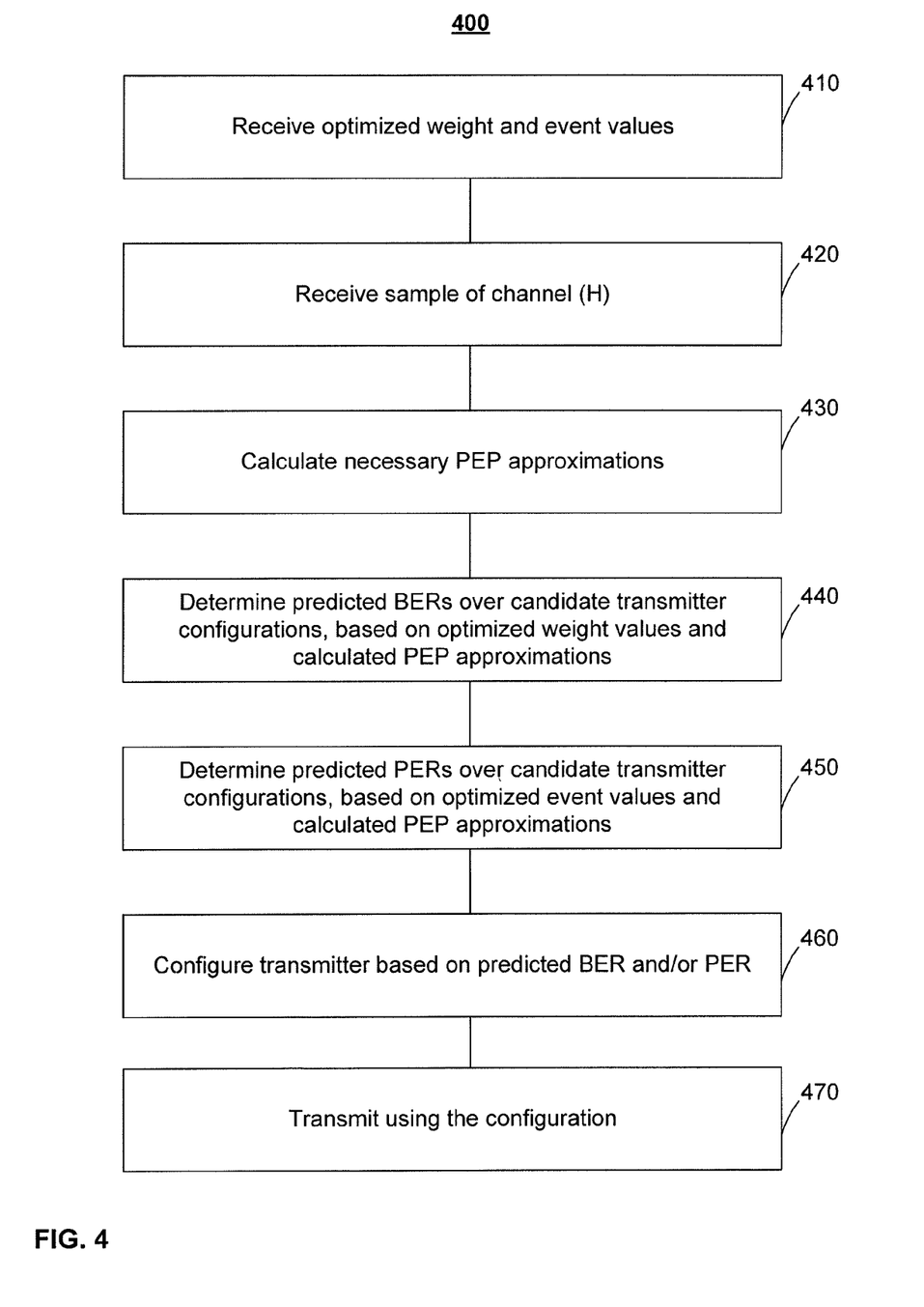
FIG. 4 depicts an example of a process for performance prediction, in accordance with some example embodiments.

FIG. 4 depicts an example of a process 400 for performance prediction, in accordance with some example embodiments.

At 410, the weight and event vectors (which may be determined as noted above with respect to optimization process 300) may be received. The weight and event vectors for the BER and PER may be received for a plurality of transmitter configurations. Although the weight and events are described as comprising vectors, each of the weights and events may be implemented in other forms, such as a set of coefficients and the like.

At 420, an estimate of the channel H may be received.

At 430, the PEP may be calculated using, for example, Equation (6), which may include the simplified PEP calculation described above that increases the interval $\Delta\theta$ to reduce the quantity of double sums (and/or integrals). In some example embodiments, the same $\Delta\theta$ used in the optimization phase is used in the prediction phase.

At 440, the BER may be determined based on a weight vector received at 410 that is associated with the error correction code, and potentially other parameters, of the transmitter configuration for the prediction, and the simplified PEP determined at 430. For example, the calculated PEP values may be multiplied by the weights to determine the predicted BER. In some example embodiments, the following equation may be used to predict the BER:

$$\text{Predicted } BER = \sum_{i=1}^{n} PEP(d_i)\text{weight}(d_i), \quad \text{Equation (15)}$$

wherein weight ($d_i$) represents the weight vector received at 410. The predicted BER calculation may be repeated over one or more candidate transmitter configurations.

At 450, the PER may be determined based on a event vector received at 410 that is associated with the error correction code, and potentially other parameters, of the transmitter configuration for the prediction, and the simplified PEP calculated at 430. For example, the calculated PEP values may be multiplied by the event vector to determine the predicted PER.

$$\text{Predicted } PER = \sum_{i=1}^{n} PEP(d_i)\text{event}(d_i), \quad \text{Equation (16)}$$

wherein event ($d_i$) represents the event vector received at 410. The predicted PER calculation may be repeated over one or more candidate transmitter configurations.

At 460, the transmitter may select transmitter configuration based on the predicted BER and/or PER over a set of candidate transmitter configurations. For example, each predicted BER and PER may be mapped to a specific transmitter configuration defining one or more of the following: a modulation type, a level of modulation, a transmit power, a code rate, and a number of streams, and the like.

At 470, the transmitter may transmit based on the settings (e.g., configuration) selected at 460. Process 400 may be repeated to adjust the transmitter configuration settings in order to further optimize the performance of system 100.

Figure 5:
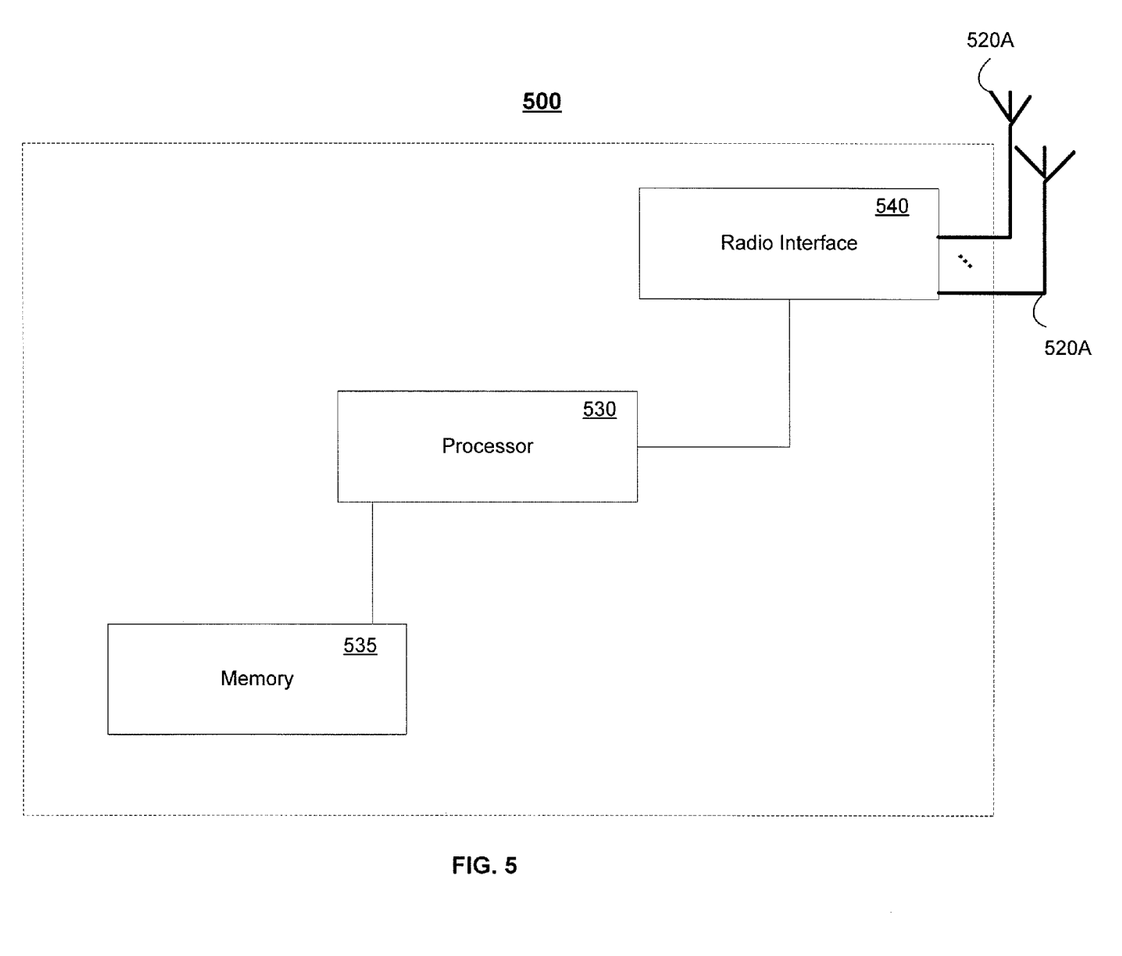
FIG. 5 depicts an example of a radio, in accordance with some example embodiments.

FIG. 5 depicts a block diagram of a radio 500. The radio 500 may include one or more antennas 520A-B for receiving a downlink and transmitting via an uplink. The radio 500 may also include a radio interface 540 (also referred to as a transceiver) coupled to the antennas 520A-B. The radio interface 540 may include one or more transmitters and receivers, such as transmitter 110 and receiver 160. Moreover, the radio interface 540 may include other components, such as filters, converters (for example, digital-to-analog converters and the like), symbol demappers, signal shaping components, an Inverse Fast Fourier Transform (IFFT) module, a Fast Fourier Transform (FFT) module, and the like, to process symbols, such as OFDMA symbols, carried by a downlink or an uplink. The radio 500 may further include one or more of the following: a user interface 525, at least one processor, such as data processor 530, for controlling user equipment 500 and for accessing and executing program code stored in memory 535. In some example embodiments, the memory 535 includes code, which when executed by at least one processor causes one or more of the operations described herein with respect to processes 200, 300, and/or 400 any other operations associated with the radio.

In some example embodiments, the radio 500 may be implemented a mobile station, a mobile unit, a subscriber station, a wireless terminal, a tablet, a smart phone, a base station, a wireless access point, and/or any other type of wireless device.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. The term "set" may include zero or more items. Moreover, the term "based on" also comprises "based on at least." Other embodiments may be within the scope of the following claims.

The different functions discussed herein may be performed in a different order and/or concurrently with each other. Furthermore, one or more of the above-described functions may be optional or may be combined. Moreover, although some of the examples described herein refer specific values and some of those values being equal to other values, these are merely examples as other values may be used as well. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
   receiving, by at least one processor, information including one or more of a set of weights, a set of events, or a channel estimate, wherein at least one of the set of weights or the set of events are determined based on an optimization; and
   determining, by the at least one processor, a transmitter configuration by performing at least one of:
   applying the set of weights to a set of pair wise error probabilities to determine a set of predicted bit error rates, or
   applying the set of events to the set of pair wise error probabilities to determine a set of predicted packet error rates.

2. The method of claim 1, wherein the determining further comprises:
   determining the set of pair wise error probabilities based on an summation using an increment of about $\pi/4$.

3. The method of claim 1, wherein the determining further comprises:
   determining the set of pair wise error probabilities based on an approximation having a $\Delta\theta$ equal to about $\pi/4$.

4. The method of claim 1, wherein the determining further comprises:
   selecting the transmitter configuration based on at least one of the set of predicted bit error rates or the set of predicted packet error rates.

5. The method of claim 4 further comprising:
   configuring the transmitter based on the selected transmitter configuration.

6. The method of claim 4 further comprising:
   transmitting based on the selected transmitter configuration.

7. The method of claim 1 further comprising:
   generating the at least one of the set of weights or the set of events during an optimization phase comprising the optimization.

8. The method of claim 1, wherein the optimization comprises a convex optimization.

9. An apparatus comprising:
   at least one processor; and
   at least one memory including code which when executed by the at least one processor provides operations comprising:
   receiving information including one or more of a set of weights, a set of events, or a channel estimate, wherein at least one of the set of weights and the set of events are determined based on an optimization; and
   determining a transmitter configuration by performing at least one of:
   applying the set of weights to a set of pair wise error probabilities to determine a set of predicted bit error rates, or
   applying the set of events to the set of pair wise error probabilities to determine a set of predicted packet error rates.

10. The apparatus of claim 9, wherein the determining further comprises:
    determining the set of pair wise error probabilities based on an summation using an increment of about $\pi/4$.

11. The apparatus of claim 9, wherein the determining further comprises:
    determining the set of pair wise error probabilities based on an approximation having a $\Delta\theta$ equal to about $\pi/4$.

12. The apparatus of claim 9, wherein the determining further comprises:
    selecting the transmitter configuration based on at least one of the set of predicted bit error rates or the set of predicted packet error rates.

13. The apparatus of claim 12 further comprising:
    configuring the transmitter based on the selected transmitter configuration.

14. The apparatus of claim 12 further comprising:
    transmitting based on the selected transmitter configuration.

15. The apparatus of claim 9 further comprising:
    generating the at least one of the set of weights or the set of events during an optimization phase comprising the optimization.

16. The apparatus of claim 9, wherein the optimization comprises a convex optimization.

17. A non-transitory computer-readable storage medium including code which when executed by at least one processor provides operations comprising:
    receiving information including one or more of a set of weights, a set of events, or a channel estimate, wherein at least one of the set of weights and the set of events are determined based on an optimization; and
    determining a transmitter configuration by performing at least one of:
    applying the set of weights to a set of pair wise error probabilities to determine a set of predicted bit error rates, or applying the set of events to the set of pair wise error probabilities to determine a set of predicted packet error rates.

* * * * *

UNITED STATES PATENT AND TRADEMARK OFFICE
CERTIFICATE OF CORRECTION

PATENT NO.        : 9,001,923 B2                                   Page 1 of 1
APPLICATION NO.   : 13/666820
DATED             : April 7, 2015
INVENTOR(S)       : Donald C. Cox et al.

It is certified that error appears in the above-identified patent and that said Letters Patent is hereby corrected as shown below:

In the Specification

Column 1, line 3, please insert

-- STATEMENT OF GOVERNMENT SPONSORED SUPPORT

This invention was made with Government support under contract FA8721-05-C-0002 awarded by the Department of the Air Force. The Government has certain rights in the invention. --

Signed and Sealed this
Twentieth Day of October, 2015

Michelle K. Lee
*Director of the United States Patent and Trademark Office*